(12) United States Patent
Rees et al.

(10) Patent No.: US 8,967,689 B2
(45) Date of Patent: Mar. 3, 2015

(54) METHOD AND A TOOL FOR HANDLING STORAGE MEDIA IN CARRIERS

(75) Inventors: Stephen Rees, Hayling Island (GB); Hoo Yuen Pang, Havant (GB); Paul Rumsey, Nr Bognor Regis (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/473,246

(22) Filed: May 16, 2012

(65) Prior Publication Data

US 2013/0307283 A1    Nov. 21, 2013

(51) Int. Cl.
*B25J 1/00* (2006.01)
*B25J 15/00* (2006.01)

(52) U.S. Cl.
USPC .............................. 294/16; 294/15; 294/103.1

(58) Field of Classification Search
CPC ............. H05K 3/00; H05K 3/32; H05K 3/30; B25B 27/14; G11B 17/04; G11B 15/68; G11B 33/128
USPC ................... 294/16, 106, 15, 34, 165, 103.1; 29/739, 758, 757, 774, 760, 278
See application file for complete search history.

(56) References Cited

U.S. PATENT DOCUMENTS

| | | | | |
|---|---|---|---|---|
| 1,014,079 A * | 1/1912 | Mckay | .............................. | 294/62 |
| 1,249,723 A * | 12/1917 | Danielson | ....................... | 294/62 |
| 1,806,856 A * | 5/1931 | Smith | ............................ | 271/268 |
| 2,778,668 A * | 1/1957 | Tomek et al. | .................... | 294/16 |
| 3,193,316 A * | 7/1965 | Custer | ............................. | 294/15 |
| 3,436,112 A * | 4/1969 | Pasquine | ......................... | 294/62 |
| 3,759,559 A * | 9/1973 | Yuska | .............................. | 294/15 |
| 4,055,364 A * | 10/1977 | Breite | .............................. | 294/16 |
| 4,109,379 A * | 8/1978 | Ratti et al. | ...................... | 294/15 |
| 4,141,138 A * | 2/1979 | Quick | .......................... | 294/99.1 |
| 4,223,934 A * | 9/1980 | Cauceglia et al. | .............. | 294/15 |
| 4,392,301 A * | 7/1983 | Hannes et al. | .................. | 29/741 |
| 5,449,262 A * | 9/1995 | Anderson et al. | ............. | 414/280 |
| 5,820,180 A * | 10/1998 | Haupt | ............................. | 294/16 |
| 6,618,255 B2 * | 9/2003 | Fairchild | ....................... | 361/726 |
| 6,650,601 B1 * | 11/2003 | Emberty et al. | ........... | 369/30.46 |
| 6,754,768 B2 * | 6/2004 | Dimitri et al. | ................ | 711/114 |
| 7,240,934 B2 * | 7/2007 | Lausell | ........................... | 294/16 |
| 7,903,401 B2 * | 3/2011 | Lee et al. | ................. | 361/679.33 |
| 2012/0139277 A1 * | 6/2012 | Ostwald et al. | ............... | 294/192 |
| 2014/0111931 A1 * | 4/2014 | Casserly et al. | ............. | 29/426.2 |

* cited by examiner

*Primary Examiner* — Paul T Chin

(74) *Attorney, Agent, or Firm* — HolzerIPLaw, PC

(57) ABSTRACT

The invention provides a method and a tool for handling storage media in carriers, the tool comprising: a tool body; a first jaw to engage a first side of the storage media in carrier; a second jaw to engage a second opposed side of the storage media in carrier; wherein at least the second jaw is pivotally mounted on the main body so as to be movable between a first position in which the jaw is positioned so as to enable a disk drive in carrier to be freely moved into an engagement position with the tool and a second position in which the jaw engages the disk drive carrier so as to releasably lock the disk drive in carrier to the tool.

10 Claims, 6 Drawing Sheets

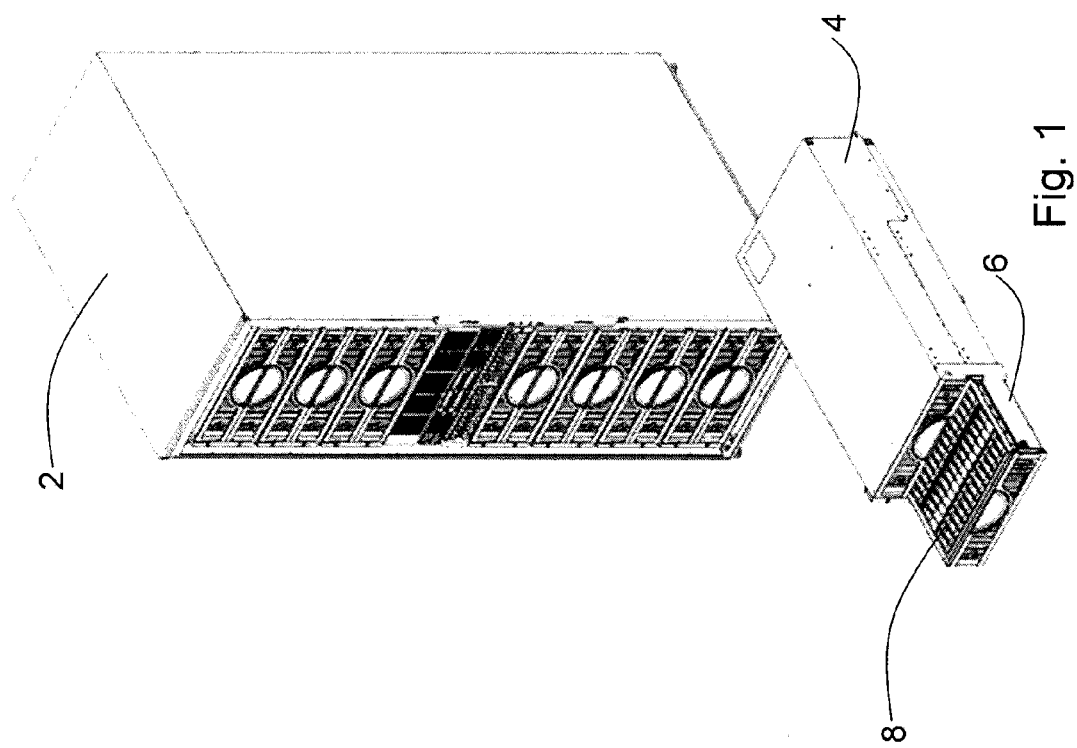

METHOD AND A TOOL FOR HANDLING STORAGE MEDIA IN CARRIERS

The present invention relates to storage media handling tool and a method of handling a storage medium.

Data storage systems typically include plural storage media arranged within a housing. The storage media may be hard disk drives or other such storage media. FIG. 1 shows a schematic representation of a storage enclosure. The enclosure is a "drawer system" in that an outer housing 2 is provided in which are arranged plural enclosures 4 each being the housing for one or more drawers 6. Individual hard disk drives 8 are arranged within the drawers 6. Thus, it will be appreciated that such an arrangement provides a high capacity storage system in which access to each of the individual disk drives 8 within the system is possible.

Given the typical size of such a storage system, the overall number of disk drives arranged within it can be high. Typically, upwards of 500 individual disk drives can be provided within such a system. Clearly, if smaller standard disk drives are used or a larger housing is used then the number of disk drives arranged within the system will vary accordingly. In any event, it can be appreciated that the number of disk drives is large. Typically, there could be as many as 84 disk drives within an individual drawer.

It is typical that in such storage systems, so as to ensure the physical security of disk drives and enable effective and repeatable insertion of disk drives into the enclosures, that disk drives are provided within carriers. A carrier may be any suitable housing for a disk drive within the storage system and one such example is shown in FIG. 1A.

Some means for enabling quick and efficient loading of the storage media in carriers into the housing is desired. In addition some means for enabling quick and efficient removal of the storage media in carriers from the housing is also desired.

According to a first aspect of the present invention, there is provided a tool for handling storage media in carriers, the tool comprising: a tool body; a first jaw to engage a first side of the storage media in carrier; a second jaw to engage a second opposed side of the storage media in carrier; wherein at least the second jaw is pivotally mounted on the main body so as to be movable between a first position in which the jaw is positioned so as to enable a disk drive in carrier to be freely moved into an engagement position with the tool and a second position in which the jaw engages the disk drive carrier so as to releasably lock the disk drive in carrier to the tool.

A simple yet robust tool is provided which enables the quick, safe and efficient loading and unloading of storage media in carriers into our out of a storage system. The use of a tool with a pivotally mounted movable jaw enables the carrier of a storage medium such as a disk drive to be securely and quickly engaged which thus enables the simplification of handling such media during processing. In particular, the tool enables disk drives to be loaded into a storage system more quickly than if it were to be done manually as was previously the case.

Preferably, the body comprises a first handle on the first side of the tool; and a second handle on the second side of the tool and wherein the second jaw is pivotally coupled to the tool body in the region of the second handle.

The shape and form of the jaws or other engagement means on the tool will be related to the carrier. In the case of a carrier like that shown in FIG. 1A, the jaws are sized and configured to engage the lips or underside of the surface 9. If the carrier has a different form then the jaws will be correspondingly different, as will be understood by a skilled person. For example, it could be that the carrier has a simple box-like structure without engagement lips but with one or more holes or regions for engagement by the jaws on the tool.

Preferably, the tool body has a central planar section being substantially rectangular, and in which the second jaw is arranged to pivot about an axis substantially parallel to the length of the central planar section. Having the pivot axis configured in this manner will ensure that the direction of movement of the movable jaw is such as to enable it to engage or disengage from a disk drive or storage medium in a carrier without the risk of fouling the carrier.

Preferably, the first jaw is provided on a moveable handle.

Preferably, the handle is sized to fit within the outer limits of the first handle. This ensures that when the handle is closed, it does not interfere with an operators handling of the tool.

Preferably, the central planar section is in the form of a lattice.

Preferably, the main body is formed of a material selected from steel, aluminium and composite.

Preferably, at least one of the jaws is formed from a material different and harder from that from which the main body is formed.

Preferably, the jaws are both formed from hardened steel.

Preferably, the jaws are shaped and configured so as to define an opening between the main housing and the jaws sized to receive a housing of the storage media carrier. In one embodiment where the carrier is formed with lips, the jaws are sized to engage and lock between the disk drive and the lips so as to securely carry with the tool, the storage media in carriers.

Preferably, the jaws are provided with a cam surface to facilitate engagement with the storage media carrier.

Preferably, the arrangement of the arm and the pivot is such as to bias the arm into the open configuration under its own weight.

In this preferred embodiment, a significant advantage of the tool is that there is no spring biasing required to enable the locking handle to move into its open configuration. The shaping and/or arrangement of the handle may be such that the centre of gravity does not lie directly over the pivot axis and this will ensure that once the releasable lock is opened, the handle will automatically move into the open configuration.

Preferably, the tool comprises a locking pin coupled to the housing and arranged to engage the handle and releasably lock the handle in the closed configuration.

Preferably, the handle has a shaped recess to receive the locking pin.

Preferably, the handle has a cam to guide the locking pin into the recess. The use of a cam on the handle ensures that in normal use, locking of the handle in the closed position will occur automatically and reliably without presenting any difficulty to a user.

According to a second aspect of the present invention, there is provided a method of moving one or more storage media in carriers, the method comprising, engaging the media carrier with a tool comprising a first jaw to engage a first side of the storage media in carrier and a second pivotable jaw to engage a second opposed side of the storage media in carrier; and, moving the second jaw between a first position in which the jaw is positioned so as to enable a disk drive in carrier to be freely moved into an engagement position with the tool and a second position in which the jaw engages the disk drive carrier so as to releasably lock the disk drive in carrier to the tool.

As above, a simple yet robust method is provided which enables the quick, safe and efficient loading and unloading of storage media in carriers into our out of a storage system. The use of a method in which with a pivotally mounted movable jaw is used enables the carrier of a storage medium such as a disk drive to be securely and quickly engaged which thus enables the simplification of handling such media during processing.

Embodiments of the present invention will now be described in detail with reference to the accompanying drawings, in which:

FIG. 1 is a schematic representation of a storage system;

Figure 2:
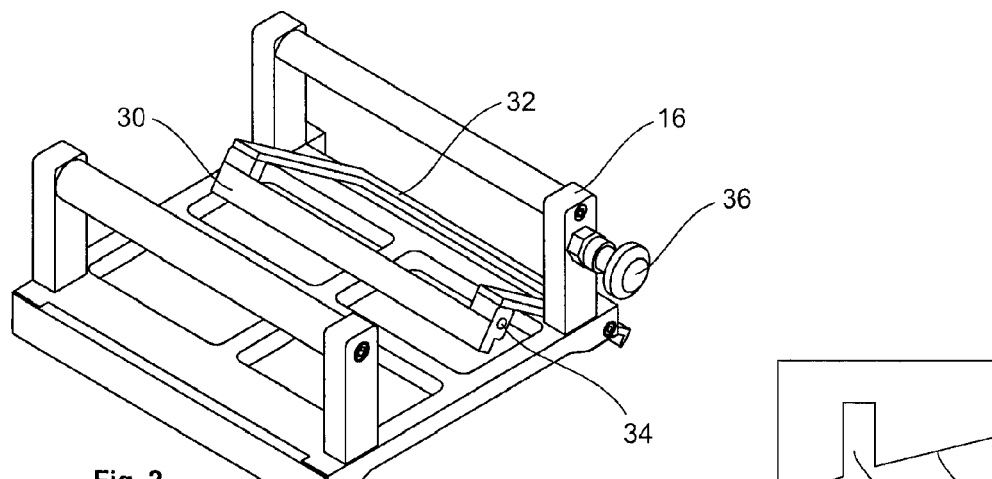
FIG. 2 is a representation of a loader for loading disk drives into a storage enclosure.
Figure 2A:
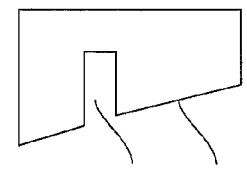
FIG. 2A is a schematic representation of a section through a part of the loader of FIG. 2.
Figure 3:
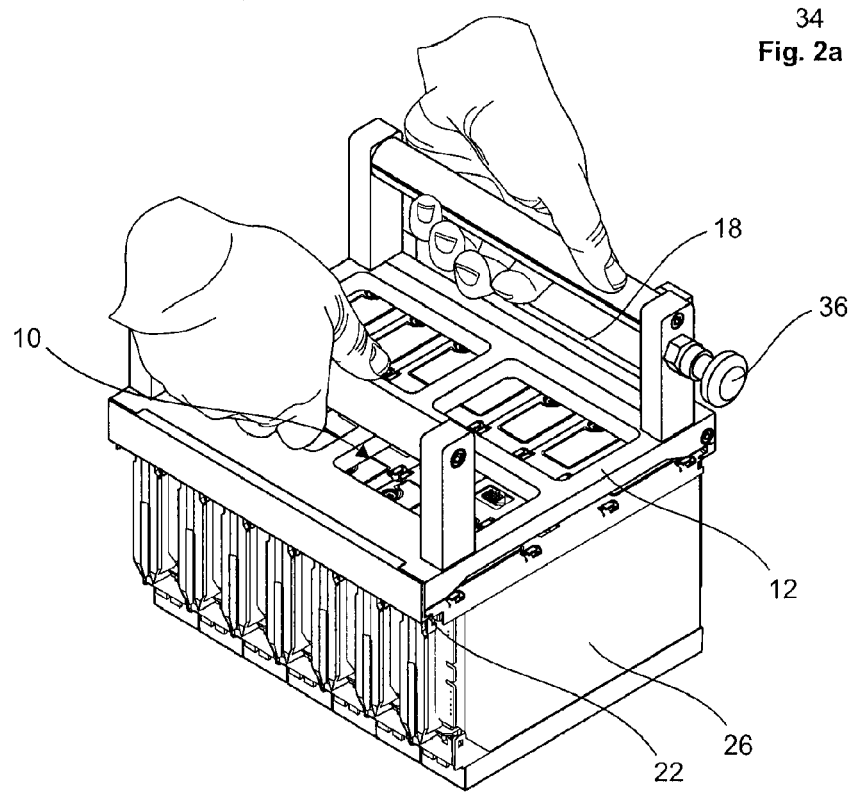
Figure 2B:
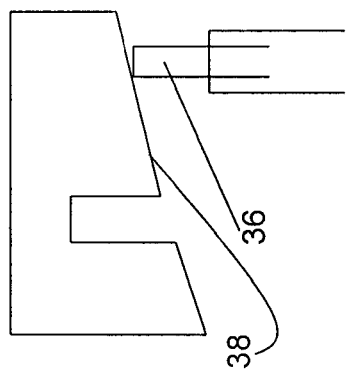
Figure 2C:
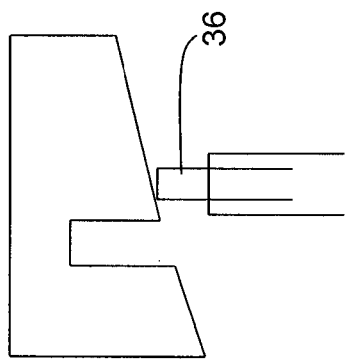
Figure 2D:
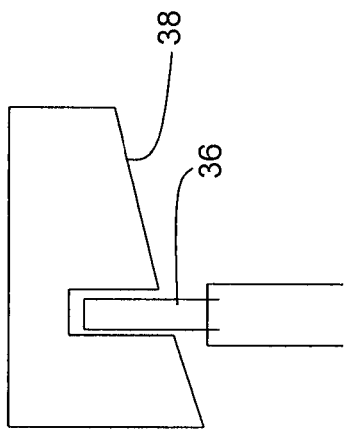
Figure 6:
Figure 5:
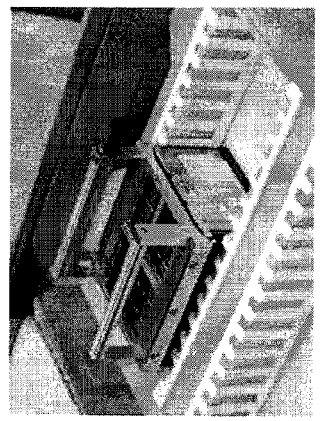
Figure 4:
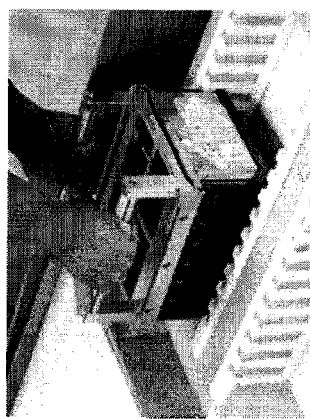
Figure 7:
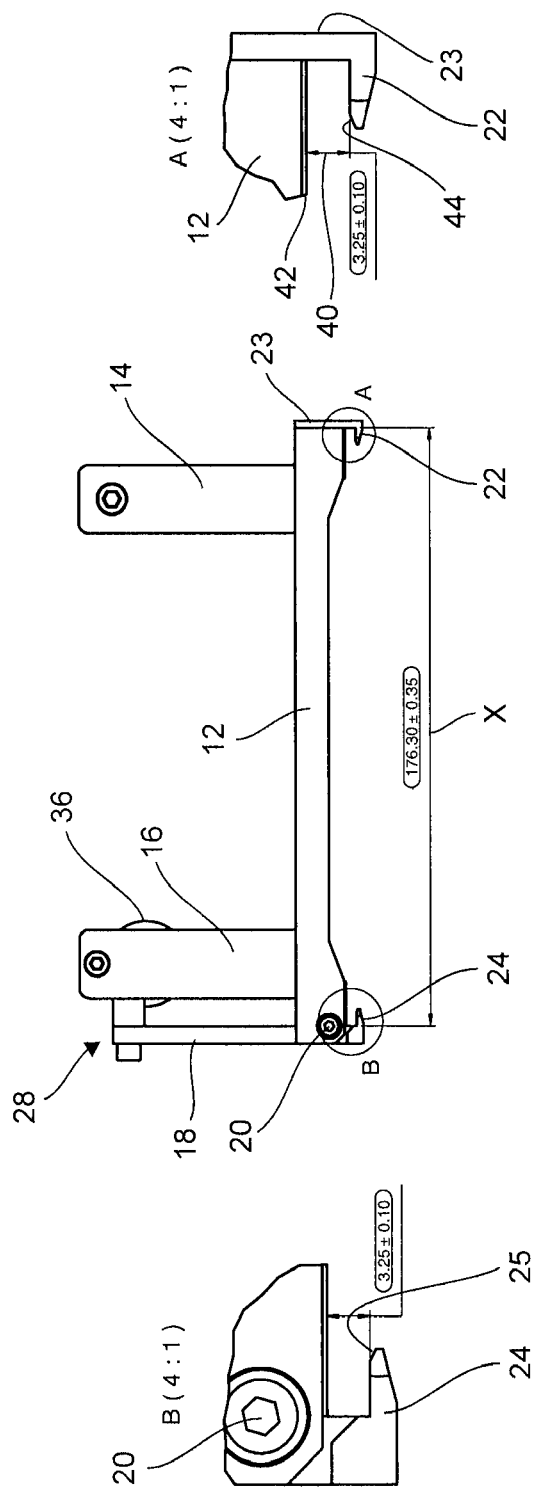

FIGS. 2B, 2C, and 2D are schematic representations of steps of engagement between a locking pin and the part of the loader of FIG. 2A;

FIG. 3 is a representation of the loader of FIG. 2 shown holding a number of disk drives;

FIG. 4 is a schematic representation of the loader of FIG. 3 having positioned the disk drives within an enclosure;

FIG. 5 is a schematic representation of the loader of FIG. 3 in the process of removing a disk drive from a storage enclosure;

FIG. 6 is a schematic representation of the loader of FIG. 3 being disengaged from a disk drive positioned within a storage enclosure;

FIG. 7 is an end view of the loader with the movable arm in a closed position.

Referring first to FIG. 7, a side view profile of a storage medium handling tool is shown. The tool 10 comprises a base plate 12 and upstanding arm members 14 and 16. The arm members 14 and 16 are provided generally at opposite sides of the base plate 12. The first of the arm members, 14, is fixed with respect to the base plate 12. The second arm member 16 is also fixedly mounted to the base plate 12. In addition, a locking handle 18 is provided. The locking handle is pivotally mounted to the base plate 12 at a pivot 20 such that it can rotate about a pivot axis between an open position (as shown in FIG. 2) and a closed position as shown in FIG. 7. First and second jaws 22 and 24 are provided. The first jaw 22 is provided on the same side of the base plane 12 as the first handle 14. The jaw 22 is arranged and sized to engage with a disk drive carrier, as will be explained in greater detail below.

The jaw 24 is provided on a lower end of the locking handle 18 and is similarly sized and shaped to the first jaw 22.

Figure 1A:
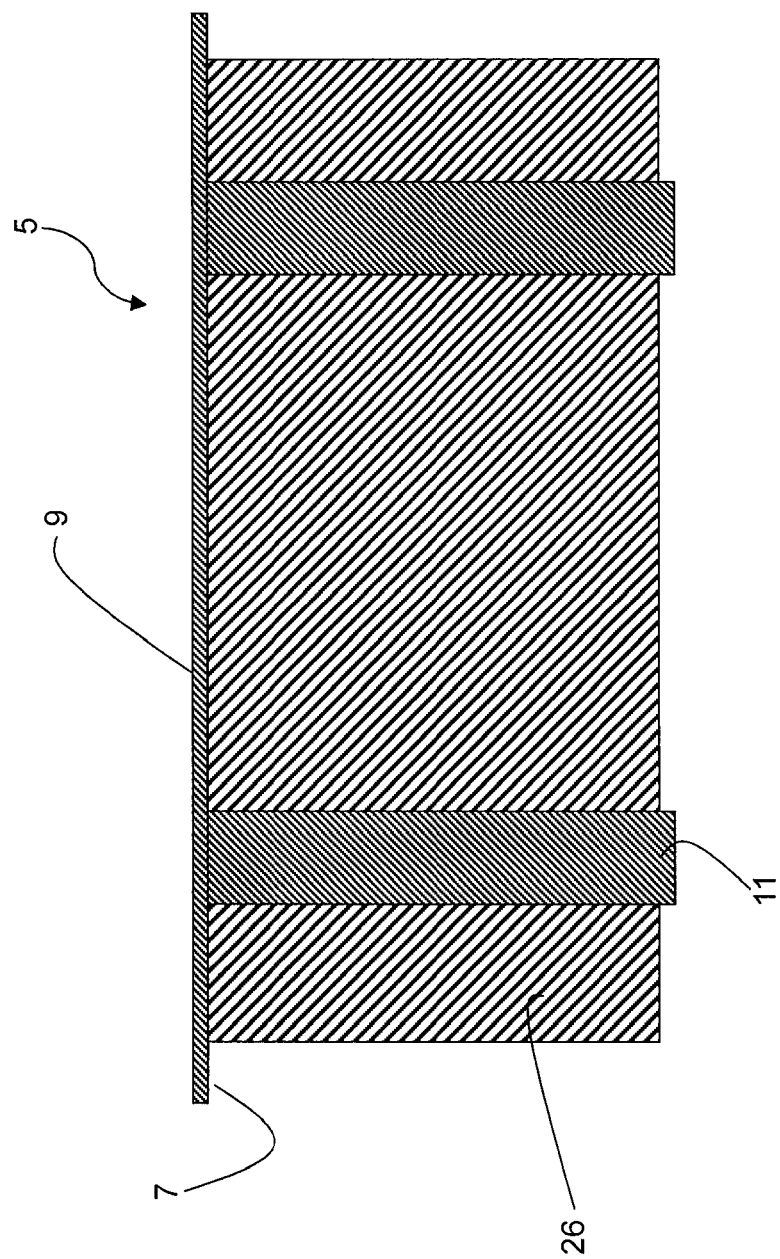
FIG. 1A is schematic representation of a disk drive in a carrier.

As mentioned above, it is typical that in such storage systems, disk drives are provided within carriers. The carrier 5 of FIG. 1A is shown schematically as having an upper surface 9 and side members 11. The upper surface 9 defines a lip 7 at either end of the disk drive 26. It is the lip 7 with which the tool of FIG. 7 is arranged to engage, as will be explained in detail below. It will of course be appreciated that carriers with other means for engagement (other than lips) may be used. The means for engagement on the tool 10 would be correspondingly different, but the overall manner of operation would be largely the same, as will be explained below.

In use, the handle 18 is arranged to pivot around the axis 20 such that the jaw 24 can be engaged or disengaged from a disk drive carrier such as that shown in FIG. 1A. In the open configuration, the first jaw 22 can be engaged with a disk drive carrier. The handle 18 is then pivoted about the axis 20 such that the jaw 24 engages with the disk drive carrier. The handle is then pivoted to a substantially upright position (as shown in FIG. 7) such that the jaws 22 and 24 are effectively locked about the disk drive carrier.

In this position, the arm members 14 and 16 can be engaged by a user and the tool 10 lifted such as to lift the disk drives in their carriers for movement to another location. FIG. 3 shows this clearly. As seen, the tool 10 is engaged with plural disk drives in carriers 26.

Referring to FIG. 2, the locking handle 18 comprises shaped end members 28 which are generally L-shaped and have connected between their upper and lower ends crossbeams 30 and 32. The end members 28 of the locking handle 18 are positioned and sized so as to pivot within the outer limits of the arm member 16.

As seen in FIG. 2, the locking handle 18, when in the open position, is effectively folded down onto or towards the plane of the central member 12.

Some means for releasably locking the locking handle 18 in the closed configuration is provided. In the example shown in FIG. 2, a recess 34 is provided in one of the end members 28. A plunge spring locking pin 36 is provided coupled to the arm member 16. The locking pin 36 is biased towards the arm member 16 and has a projection (not shown) that is shaped and sized to engage with the end member 28 and the recess 34. Thus, when the locking handle 18 is pivoted upwards into the closed position, the recess 34 automatically engages with the protrusion provided on the locking pin 36. This causes the locking handle 18 to be releasably locked in the closed configuration and therefore enables safe handling of disk drives and carriers connected to the tool.

To release the locking handle and enable the tool to be released from the disk drives and carriers to which it is connected, the locking pin 36 is withdrawn, against a spring bias, so as to release the projection from the recess 34. This enables the locking handle to pivot about the axis 20 (downwards towards the base plane 12), into the open configuration. In this configuration the tool can be disengaged from the disk drives and carriers.

As mentioned above, in cross section, the general shape of the locking handle 18 is L-shaped. This ensures that the centre of gravity of the handle is translationally displaced from the pivot axis 20. In other words considering the tool on a flat surface, if the arms 14 and 16 extend vertically upwards, the L-shape of the cross section of the locking handle 18 will ensure that the centre of gravity of the locking handle is not in the vertical plane of the arms 14 and 16. This means that once the locking pin has been opened, the handle 18 automatically, and without direct operator intervention, pivots to the open configuration. There is no complex spring biasing or electronic control required for this automatic opening mechanism to operate. The simple arrangement of the handle and configuration of its centre of gravity with respect to the pivot axis enables this to happen.

In the example shown in FIGS. 2 and 7, the tool 10 comprises one locking handle 18 which is selectively configurable as described above. In other examples, it is of course possible to provide movable locking handles on both sides of the base plane 12. However typically, in use, it is not detrimental to have one of the jaws fixed since the tool itself is not particularly heavy and can easily be manipulated into a position whereby a fixed jaw 22 can be engaged with disk drives and carriers. Thus, the manufacture and assembly of the tool is simplified in the case where there is only one moving locking handle.

Referring to FIG. 2A, a plan view of a horizontal section through the top of the end section 28 of the locking handle 18 is shown. As can be seen, the recess 34 is sized to receive a projection (not shown in FIG. 2A) from the plunge spring locking pin 36. The end section 28 has a sidewall which includes a cam surface 38 to guide the locking pin into the recess as the handle 18 moves from the open configuration to the locked configuration. The cam surface 38 could be provided as part of a groove within the end member 28 or simply as a sloped section on the side of the arm 18. By providing such an arrangement, this ensures that the projection on the pin 36 can be guided securely and repeatedly, safely into the recess 34 and thereby enable easy locking of the tool in the closed configuration.

FIGS. 2B to 2D show the steps of engagement between the locking pin 36 and the cam surface 38 as the pin is guided into the recess on the handle 18. In FIG. 2B, the locking pin 36 first encounters and is engaged by the cam surface 38 as the handle is being closed and moved into the locked position. As the handle 18 continues to close (FIG. 2C), the surface 38 compresses the pin 36 against a spring bias until, as seen in FIG. 2D the pin extends against its spring bias into the recess within the handle 18, thus locking the handle closed.

In another embodiment, the recess and projection arrangement of the locking pin 36 and the arm 18 is reversed. In other words, the recess is provide don the sprung handle and a projection is provided on the locking handle 18.

As mentioned above, a significant advantage of the tool is that there is no spring biasing required to enable the locking handle to move into its open configuration. The shaping of the handle such that the centre of gravity does not lie directly over the pivot axis ensures that once the releasable lock is opened, the handle will automatically move into the open configuration.

The width of the tool (dimension X in FIG. 7) is sized so as to correspond to a disk drive in a carrier. Clearly, the sizing can be varied in dependence on application. In one example, the base plane 12 comprises two components which are lockably telescopically mounted arranged such that the dimension X can be varied. This enables the tool to be used for disk drives of different dimensions.

The length of the tool is selected so as to enable the tool to be capable of holding a desired number of disk drives in carriers at any one time. In the example shown in FIG. 3, the length is such as to carry seven disk drives in carriers at any one time.

Referring now to FIGS. 3 to 6, the process by which plural disk drives and carriers may be positioned within a storage enclosure is described.

In FIG. 3, there is shown a tool 10 holding seven disk drives within their carriers. The handle 18 is in the closed configuration with the locking pin 36 engaged with the recess 34 in the end member 28. Thus, on first appearance, the locking handle cannot immediately be seen.

Next, referring to FIG. 4 the disk drives and carriers are placed within the housing of a storage enclosure. The disk drives are lowered slowly and carefully into corresponding slots within the enclosure and then released.

In FIG. 5, the disk drives are lowered fully into their rest position.

In FIG. 6 the handle is released and falls automatically into the open configuration, due to the biasing caused by the weight distribution on the handle described above, thereby enable the tool to be removed and used again. It should be noted that some form of spring biasing can be provided as well as the weight biasing described above but it is generally not necessary.

Thus, the tool provides a means by which disk drives can be quickly and efficiently loaded into a storage enclosure. Whereas previously such loading was a manual handling exercise performed on a disk drive by disk drive basis the tool of the present disclosure enables plural disk drives to be quickly and safely loaded into or removed from a storage enclosure.

To summarise operation of the loader, typically the loader is placed on the top face of a disk drive in carrier (may be placed on up to seven). The handle and jaws on one side of the speed loader are fixed, the jaws locating the front underside of the upper face of a disk drive in carrier. The hinged handle is closed to engage the jaws with the rear underside of the upper face of a disk drive in carrier. This action serves to clamp the disk drive in carrier in place with respect to the tool. The orientation of a disk drive in carrier when engaged by the tool is inconsequential. In other words, the disk drive in carrier front or rear end can be located first. However, it is good practice to ensure that all disk drives in carriers are oriented in the same directly.

Once the handle is closed, the disk drives in carrier are clamped in place in the tool 10. The plunge spring automatically engages the recess in the side handle, locking the handle into place and preventing the jaws from inadvertently being opened whilst carrying the disk drives in carriers.

The disk drives in their carriers can then be transferred to a suitable product, packaging or storage location. The spring can then be pulled open to disengage the recess, releasing the handle and opening the jaws. The tool is thus released from the disk drives in carriers.

Referring again to FIG. 7, the jaws 22 and 24 can be seen. A first of the jaws 22, adjacent to the arm 14, is fixed relative to the plane 12 or tool 10 as a whole. The fixed jaw 22 may include a fixing plate 23 which is fixed to the base plate 12 in some appropriate manner. For example, rivets or screws may be used. The jaws 22 and 24 are arranged such that there is an opening 40 between the bottom surface 42 of the base plate 12 and the jaw itself. The opening is sized so as to engage the upper surface of a disk drive carrier. The end of the jaw 44 comprises a guiding surface 25 surface to facilitate easy engagement of the jaw with the disk drive in carrier.

Typically, the tool is formed of a material that is both strong and light. Typically, the tool may be formed of aluminium which is particularly easy to mould and is both light and strong. Preferably, one or both of the jaws are replaceable and may be formed of a harder material than aluminium. In some examples, hardened steel is used for the jaws (in the case of the jaw 22, optionally including both the end part of the jaw that engages the underside of a disk drive carrier and the fixing plate 23) which improves the wear and tear of the tool and also enables individual jaws to be replaced when damaged instead of requiring the whole tool 10 itself to be replaced.

Embodiments of the present invention have been described with particular reference to the examples illustrated. However, it will be appreciated that variations and modifications may be made to the examples described within the scope of the present invention.

The invention claimed is:

1. A tool for handling storage media in carriers, the tool comprising:
   a tool body;
   a first jaw to engage a first side of the storage media in carrier;
   a second jaw on a moveable handle to engage a second opposed side of the storage media in carrier;
   wherein at least the second jaw is pivotally mounted on the tool body so as to be movable between a first position in which the jaw is positioned so as to enable storage media in carrier to be freely moved into an engagement position with the tool and a second position in which the jaw engages the storage media in carrier so as to releasably lock the storage media in carrier to the tool, wherein the tool body has a central planar section in the form of a lattice; and a fixed arm extending from the tool body and comprising two fixed vertical members and a connecting cross member, wherein the handle is sized to fit within the outer limits of the fixed arm.

2. A tool according to claim 1, in which the tool body is formed of a material selected from steel, aluminum and composite.

3. A tool according to claim 2, in which at least one of the jaws is formed from a material different and harder from that from which the tool body is formed.

4. A tool according to claim 3, in which the jaws are both formed from hardened steel.

5. A tool for handling storage media in carriers, the tool comprising:
    a tool body;
    a first jaw to engage a first side of the storage media in carrier;
    a second jaw to engage a second opposed side of the storage media in carrier;
    wherein at least the second jaw is pivotally mounted on the main body so as to be movable between a first position in which the jaw is positioned so as to enable a storage media in carrier to be freely moved into an engagement position with the tool and a second position in which the jaw engages the storage media in carrier so as to releasably lock the storage media in carrier to the tool,
    wherein the body comprises a first arm on the first side of the tool, and a second arm on the second side of the tool and wherein the second jaw is pivotably coupled to the tool body in the region of the second arm,
    wherein the first and second jaws are shaped and configured so as to define an opening and the first and second jaws are sized to receive the storage media in carrier, and
    wherein the first and second jaws are provided with a cam surface to facilitate engagement with the storage media in carrier.

6. A tool according to claim 5, in which the tool body has a central planar section being substantially rectangular, and in which the second jaw is arranged to pivot about an axis substantially parallel to the length of the central planar section.

7. A tool for handling storage media in carriers, the tool comprising:
    a tool body;
    a first jaw to engage a first side of the storage media in carrier;
    a second jaw to engage a second opposed side of the storage media in carrier;
    wherein at least the second jaw is pivotally mounted on the tool body so as to be movable between a first position in which the jaw is positioned so as to enable a storage media in carrier to be freely moved into an engagement position with the tool and a second position in which the jaw engages the disk drive carrier so as to releasably lock the storage media in carrier to the tool, in which the second jaw is provided on a moveable handle, and
    in which the arrangement of the handle and the pivot is such as to bias the handle into the open configuration under its own weight.

8. A tool according to claim 7, comprising a locking pin arranged to engage the handle and releasably lock the handle in the closed configuration.

9. A tool according to claim 8, in which the handle has a shaped recess to receive the locking pin.

10. A tool according to claim 9, in which the handle has a cam to guide the locking pin into the recess.

* * * * *